US009453563B2

(12) United States Patent
Alfano et al.

(10) Patent No.: US 9,453,563 B2
(45) Date of Patent: Sep. 27, 2016

(54) LINEAR ACTUATOR

(75) Inventors: Don C. Alfano, Roscoe, IL (US);
Robert Lipsett, San Jose, CA (US);
Edward Myers, Crystal Lake, IL (US);
Gregory Nichols, Crystal Lake, IL
(US); Peter Paulsson, Broby (SE)

(73) Assignee: DANAHER CORPORATION, Wood Dale, IL (US)

( * ) Notice: Subject to any disclaimer, the term of this patent is extended or adjusted under 35 U.S.C. 154(b) by 0 days.

(21) Appl. No.: 13/823,254

(22) PCT Filed: Sep. 23, 2011

(86) PCT No.: PCT/US2011/052919
§ 371 (c)(1),
(2), (4) Date: May 2, 2013

(87) PCT Pub. No.: WO2012/040556
PCT Pub. Date: Mar. 29, 2012

(65) Prior Publication Data
US 2013/0319148 A1    Dec. 5, 2013

Related U.S. Application Data

(60) Provisional application No. 61/386,280, filed on Sep. 24, 2010.

(51) Int. Cl.
*F16H 3/06*    (2006.01)
*F16H 25/12*    (2006.01)
(Continued)

(52) U.S. Cl.
CPC .............. *F16H 25/12* (2013.01); *F16H 25/20* (2013.01); *H02K 7/06* (2013.01); *F16H 2025/209* (2013.01); *F16H 2025/2031* (2013.01); *F16H 2025/2081* (2013.01);
(Continued)

(58) Field of Classification Search
CPC ............ F16H 25/12; F16H 2025/209; F16H 2025/2093; F16H 25/20; F16H 2025/2031; F16H 2025/2081; H02K 5/04; H02K 7/06
USPC ...................... 74/89.23, 89.33, 89.37, 89.38
See application file for complete search history.

(56) References Cited

U.S. PATENT DOCUMENTS 6,101,889 A * 8/2000 Laskey ................. 74/89.23
7,066,041 B2   6/2006 Nielsen
(Continued)

FOREIGN PATENT DOCUMENTS

CN    1468350 A    1/2004
CN    1922418 A    2/2007
(Continued)

OTHER PUBLICATIONS

Written Opinion of the International Searching Authority, Application No. PCT/US2011/052919 dated Apr. 24, 2012.
(Continued)

*Primary Examiner* — William Kelleher
*Assistant Examiner* — Zakaria Elahmadi
(74) *Attorney, Agent, or Firm* — MacMillan, Sobanski & Todd, LLC

(57) ABSTRACT

A linear actuator includes a housing and a cover tube that is supported relative to the housing. A nut engages the cover tube so as to prevent rotation of the nut relative to the cover tube. A lead screw rotatably engages the nut, wherein rotation of the lead screw causes the nut to travel along the lead screw.

7 Claims, 4 Drawing Sheets

(51) Int. Cl.
*F16H 25/20* (2006.01)
*H02K 7/06* (2006.01)
*H02K 5/04* (2006.01)

(52) U.S. Cl.
CPC ........ *F16H 2025/2093* (2013.01); *H02K 5/04* (2013.01); *Y10T 74/18648* (2015.01)

(56) References Cited

U.S. PATENT DOCUMENTS

| | | | |
|---|---|---|---|
| 8,015,889 B2* | 9/2011 | Wingett et al. | 74/89.23 |
| 8,015,890 B2* | 9/2011 | Christensen et al. | 74/89.38 |
| 8,181,546 B2* | 5/2012 | Larsen et al. | 74/89.38 |
| 8,193,755 B2* | 6/2012 | Jensen et al. | 318/687 |
| 8,302,227 B2* | 11/2012 | Jensen | 5/616 |
| 8,402,854 B2* | 3/2013 | Yamaguchi | 74/89.38 |
| 8,448,540 B2* | 5/2013 | Chiang et al. | 74/606 R |
| 8,453,530 B2* | 6/2013 | Duits et al. | 74/89.23 |
| 8,485,054 B2* | 7/2013 | Tateishi et al. | 74/89.39 |
| 8,495,924 B2* | 7/2013 | Fukano et al. | 74/89.23 |
| 8,701,513 B2* | 4/2014 | Rosengren et al. | 74/89.23 |
| 2004/0093969 A1* | 5/2004 | Nielsen | 74/89.23 |
| 2007/0169578 A1* | 7/2007 | Christensen et al. | 74/89.37 |
| 2008/0168852 A1* | 7/2008 | Chen et al. | 74/89.23 |
| 2009/0249904 A1* | 10/2009 | Chen et al. | 74/89.23 |
| 2010/0139427 A1* | 6/2010 | Yamaguchi et al. | 74/89.33 |
| 2010/0192713 A1* | 8/2010 | Duits et al. | 74/89.23 |
| 2010/0236343 A1 | 9/2010 | Chiang et al. | |
| 2010/0282008 A1* | 11/2010 | Knudsen et al. | 74/89.23 |
| 2010/0282009 A1* | 11/2010 | Knudsen et al. | 74/89.37 |
| 2011/0113955 A1* | 5/2011 | Fukano et al. | 92/172 |
| 2011/0271779 A1* | 11/2011 | Corcoran | 74/89.23 |
| 2012/0125399 A1* | 5/2012 | Schatz et al. | 136/246 |
| 2012/0222510 A1* | 9/2012 | Winther et al. | 74/89.23 |
| 2013/0283947 A1* | 10/2013 | Yamada et al. | 74/89.23 |
| 2013/0291669 A1* | 11/2013 | Hwu et al. | 74/89.23 |

FOREIGN PATENT DOCUMENTS

| | | |
|---|---|---|
| JP | H11225457 A | 8/1999 |
| JP | 2004218720 A | 8/2004 |
| JP | 200732772 | 2/2007 |
| JP | 2007032772 A | 2/2007 |

OTHER PUBLICATIONS

Chinese First Office Action, Application No. 201180045614.6 dated Dec. 2, 2014.
Extended European Search Report, Application No. EP 11827595.7 dated Dec. 17, 2015.
Notification of the Second Chinese Office Action, Application No. CN201180045614.6 dated Oct. 26, 2015.
Notification of the Third Office Action, Chinese Patent Application No. 201180045614.6, dated Jul. 5, 2016.

* cited by examiner

LINEAR ACTUATOR

CROSS-REFERENCE TO RELATED APPLICATIONS

This application claims the benefit of U.S. Provisional Application No. 61/386,280 filed Sep. 24, 2010 the disclosure of which is incorporated herein by reference.

BACKGROUND OF THE INVENTION

This invention relates in general to linear actuators that are adapted to cause linear reciprocating movement of a workpiece along a desired path. In particular, this invention relates to an improved structure for such a linear actuator that is relatively compact in size, inexpensive in construction, quiet in operation, and capable of handling relatively heavy loads.

A linear actuator is a device that can be used to cause linear movement, typically reciprocating linear movement, of a workpiece along a desired path of movement. A typical linear actuator includes an electric motor having a rotatable output shaft. The output shaft of the electric motor is connected through a gear train to a nut and lead screw mechanism. Rotation of the output shaft of the electric motor causes corresponding rotation of the lead screw. The nut has an opening formed therethrough having an internal thread. The lead screw extends through the opening and has an external thread which cooperates with the internal thread formed on the nut. The nut is mounted on the lead screw in such a manner as to be restrained from rotating with the lead screw when the lead screw rotates. As a result, rotation of the lead screw causes linear movement of the nut axially along the lead screw. The direction of such axial movement of the nut (and the workpiece connected thereto) is dependent upon the direction of rotation of the lead screw.

Linear actuators are widely used in a variety of applications ranging from small to heavy loads. To accommodate heavy loads, known linear actuator structures have been formed from relatively large and heavy metallic components. Consequently, many linear actuator structures currently in use are relatively heavy and expensive. Thus, it would be desirable to provide an improved linear actuator structure that is relatively lightweight and inexpensive to produce, and yet which is capable of handling relatively heavy loads.

SUMMARY OF THE INVENTION

This invention relates to an improved structure for a linear actuator that includes a housing. A cover tube is supported relative to the housing. A nut engages the cover tube so as to prevent rotation of the nut relative to the cover tube. A lead screw rotatably engages the nut, wherein rotation of the lead screw causes the nut to travel along the lead screw.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
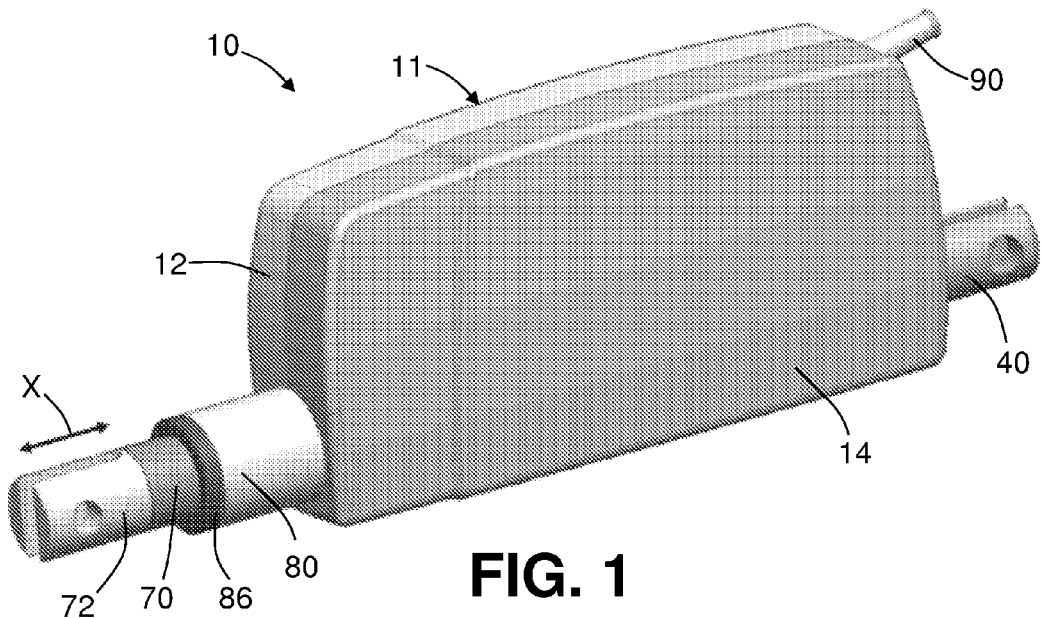
FIG. 1 is a perspective view of a linear actuator in accordance with this invention.

Referring now to the drawings, there is illustrated in FIG. 1 a linear actuator, indicated generally at 10, in accordance with this invention. The illustrated linear actuator 10 is an electromechanical actuator that is cost effective and suitable for use in applications where space is limited. For example, the linear actuator 10 can be used in applications in the healthcare market, such as bath lifts, wheel chairs, and the like. It will be appreciated, however, that the linear actuator 10 may be used in any desired environment for any desired purpose.

The illustrated linear actuator 10 includes a housing 11 that defines an internal region. The illustrated housing 11 includes a first cover 12 and a second cover 14. The housing 11 is adapted to seal internal components of the linear actuator 10 from external conditions and to prevent tampering with the internal components. For example, the first and second covers 12 and 14 can be rigid plastic members that are brought into mating engagement to form a clamshell configuration and ultrasonically welded to one another. The housing 11 may also be configured to support the internal components without the need for additional mechanical fasteners, as will be explained below. Thus, the first and second covers 12 and 14 may define corresponding support features including, for example, inwardly extending tabs, support slots, opposing bores, and the like. It will be appreciated that the first and second covers 12 and 14 can be embodied as any structures to accomplish the functions described herein.

Figure 2:
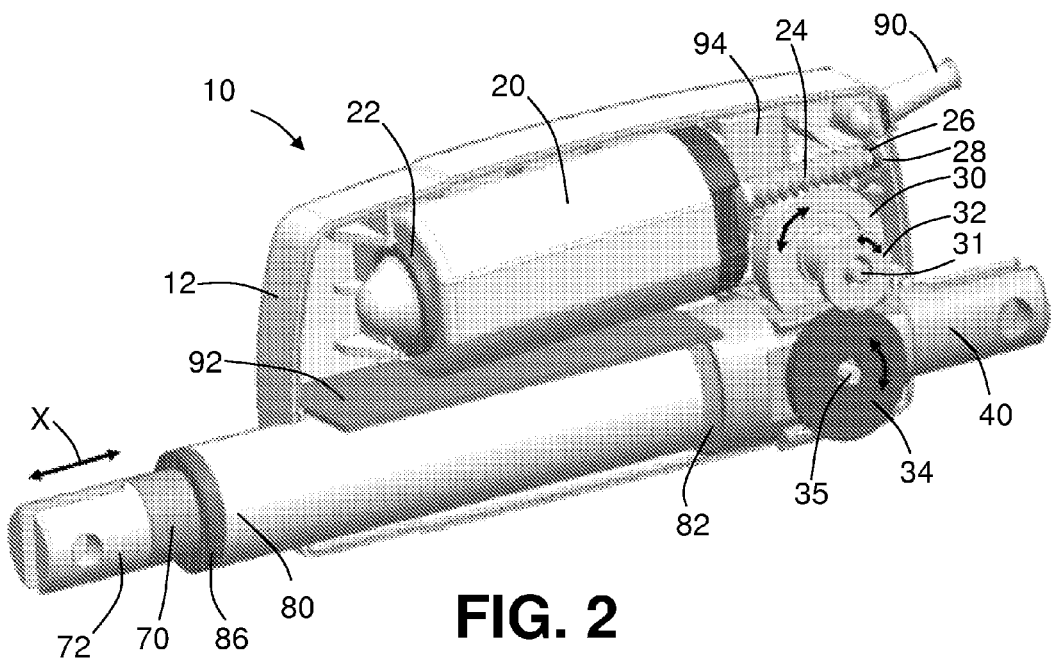
FIG. 2 is a perspective view of the linear actuator illustrated in FIG. 1, wherein an outer cover has been removed from the linear actuator.
Figure 4:
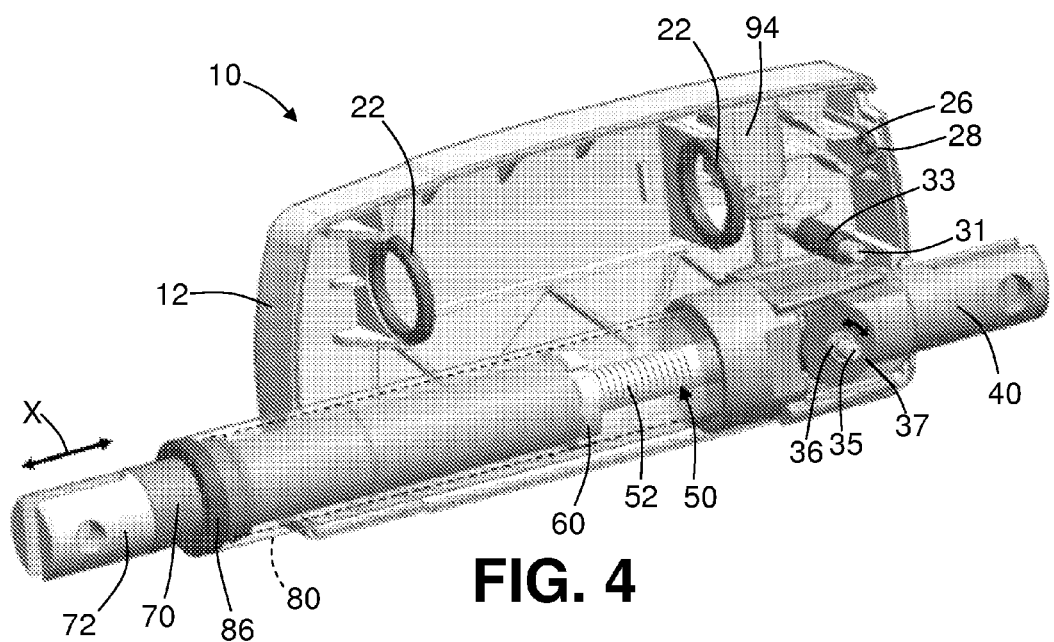
FIG. 4 is a perspective view of the linear actuator illustrated in FIG. 2, wherein additional internal components have been removed or are shown in phantom.

Referring now to FIG. 2, the linear actuator 10 is illustrated with the second cover 14 removed from the housing 11 so as to illustrate the internal components thereof. As shown, the linear actuator 10 includes a motor 20 that is adapted to provide a source of rotational power, as will be explained below. It will be appreciated that the motor 20 may be any apparatus configured to provide a source of rotational power, but is preferably an electrically powered device. As shown, the motor 20 is mounted within the housing 11 by corresponding support tabs that can be integrally formed from the first and second covers 12 and 14. A pair of O-rings 22 (both O-rings 22 are shown in FIG. 4) can be located at opposite ends of the motor 20 and be positioned between the motor 20 and the support tabs for dampening of noise and vibration that can otherwise be transferred to the housing 11.

The illustrated motor 20 includes an output shaft 24. The illustrated output shaft 24 is embodied as a threaded worm drive, the purpose of which will be explained below. A distal end of the output shaft 24 can be mounted for rotation to the first cover 12 by a bushing 26 which, in turn, is inserted into an O-ring 28 that is supported on the first cover 12. It will be appreciated that the motor 20 and the output shaft 24 can be configured in any manner to accomplish the purposes described herein and below.

Figure 3:
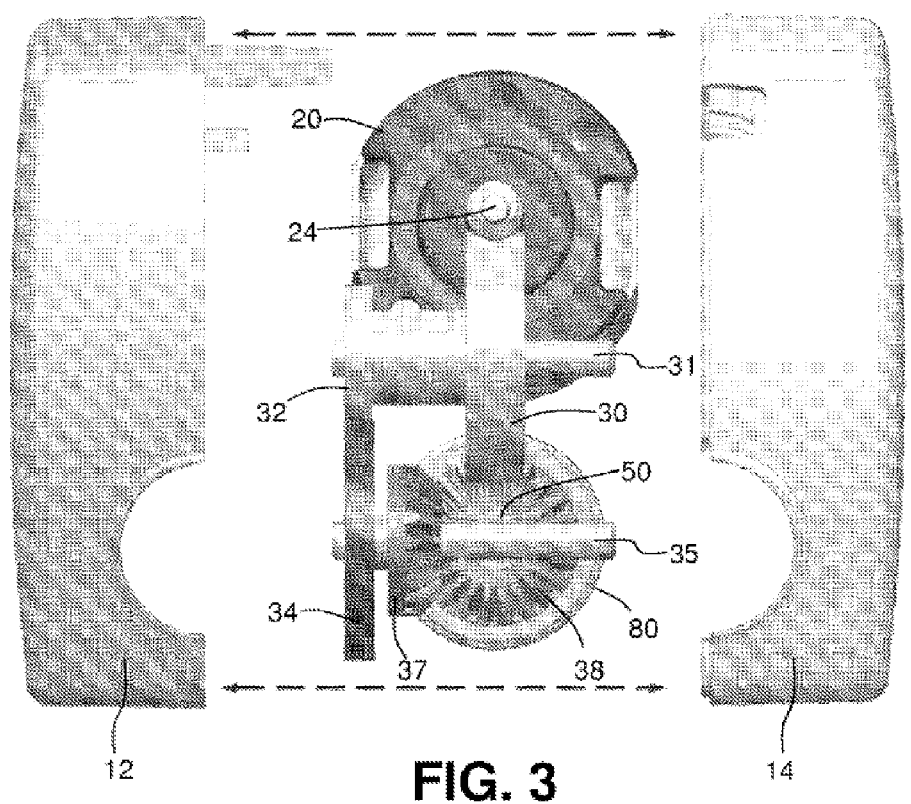
FIG. 3 is an exploded rear view of the linear actuator illustrated in FIG. 2, wherein various internal components have been removed.

Referring now to FIGS. 2 and 3, the illustrated output shaft 24 engages a worm gear 30 and rotates the worm gear 30 about a first pin 31. The illustrated first pin 31 has an axis that is generally perpendicular to an axis defined by the output shaft 24. This configuration allows a higher torque to be converted into linear motion, while also resolving resultant forces that act internally on the linear actuator 10. Accordingly, the first pin 31 can be secured to the housing 11 by a pair of opposing mounting bores defined by the first and second covers 12 and 14 (see for example FIG. 5). An input gear 32 is also mounted on the first pin 31 and is connected to the worm gear 30 for rotation therewith. Thus, the first pin 31 may include a bushing 33 (see FIG. 4) or any other bearing structure for rotatably mounting the worm gear 30 and input gear 32 thereto.

An output gear 34 is mounted on a second pin 35 for engagement with the input gear 32. The input gear 32 and the output gear 34 can be configured as any types of gear structure, such as for example spur gears or helical gears. Thus, it should be apparent that the output gear 34 is rotated in an opposite direction relative to the input gear 32. The second pin 35 can be generally parallel with the first pin 31 and, similarly, may be secured to the housing 11 by a pair of opposing mounting bores defined by the first and second covers 12 and 14 (see for example FIG. 5). A drive gear 37 may also be mounted on the second pin 35 and connected to the output gear 34 for rotation therewith. Thus, the second pin 35 may also include a bushing 36 or any other bearing structure for rotatably mounting the output gear 34 and drive gear 37 thereto.

As shown in FIG. 3, the illustrated linear actuator 10 also includes a driven gear 38 that meshes with the drive gear 37 for rotation therewith. The drive gear 37 and the driven gear 38 form a substantially right angle with one another and, therefore, can be embodied as suitable gear structures, such as bevel gears or miter gears.

Figure 6:
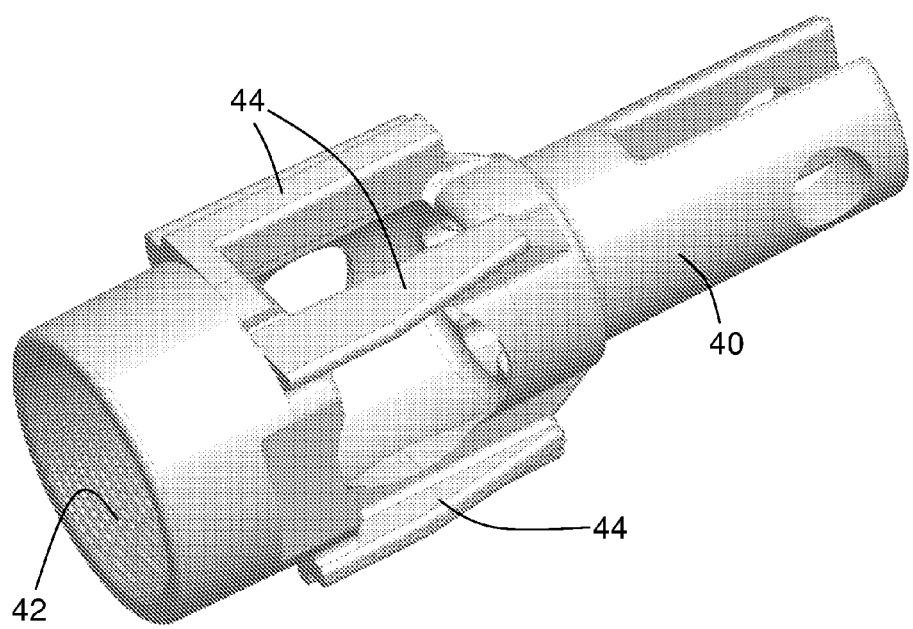
FIG. 6 is an enlarged perspective view of a thrust tube of the linear actuator illustrated in FIGS. 1, 2, and 4.

Referring now to FIGS. 2 and 6, the linear actuator 10 also includes a thrust tube 40 that is supported by the housing 11. The illustrated thrust tube 40 defines a generally cylindrical portion having an open end. The open end of the thrust tube 40 can include an internally threaded surface 42, the purpose of which will be explained below. The illustrated thrust tube 40 also includes a plurality of openings that extend through side walls thereof. As shown in FIG. 2, a lower portion of the worm gear 30 extends downwardly into an opening formed in a top surface of a thrust tube 40, respectively. This configuration allows for the linear actuator 10 to incorporate a desired gear ratio while also minimizing the amount of space occupied within the internal region of the housing 11. Further, the thrust tube 40 can include one or more support members 44 for engaging the first and second covers 12 and 14 to securely mount the thrust tube 40 within the housing 11. The thrust tube 40 can be configured in any manner for any desired application.

As shown, an opposite end of the thrust tube 40 extends from the housing 11 through an aperture (not shown) that is defined by the first and second covers 12 and 14. The end portion of the thrust tube 40 defines a mounting portion that is configured to secure the linear actuator 10 to a separate component (not shown). For example, the illustrated thrust tube 40 defines a bifurcated end having a thru-hole extending therethrough. The end portion of the thrust tube 40 may, however, be configured in any manner for any desired purpose.

Figure 5:
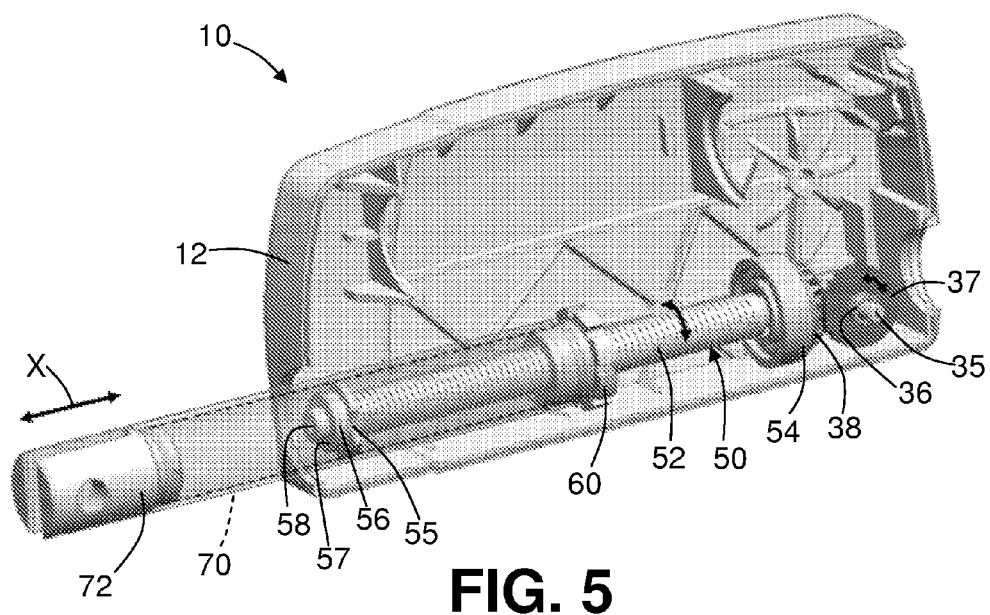
FIG. 5 is a perspective view of the linear actuator illustrated in FIG. 4, wherein additional internal components have been removed or are shown in phantom.

Referring now to FIGS. 4 and 5, the linear actuator 10 is illustrated with additional internal components removed or shown in phantom. As shown, the linear actuator 10 also includes a lead screw 50. The illustrated lead screw 50 defines an elongated shaft that is supported for rotation within the housing 11. The lead screw 50 defines an external thread 52, the purpose of which will be explained below. The external thread 52 can have any angle, pitch, lead, depth or other dimensions as desired. It should be appreciated that the lead screw 50 can be configured in any manner for a desired application.

A first end of the illustrated lead screw 50 extends into the open end of the thrust tube 40. As shown in FIG. 5, a bearing assembly 54 can be inserted into the open end of the thrust tube 40 for rotatably supporting the lead screw 50 therein. It should be appreciated that the bearing assembly 54 can be embodied as any bearing structure, including for example a ball bearing assembly or the like. The illustrated driven gear 38 is mounted to the first end of the lead screw 50 using, for example, a splined connection or the like. Thus, it should be appreciated that operation of the motor 20 rotates the respective gears which results in rotation of the lead screw 50.

A second end of the lead screw 50 includes a stop washer 55, an elastic bushing 56, a second washer 57, and a fastener 58. The elastic bushing 56 can be positioned between the stop washer 55 and the second washer 57. The fastener 58 can be secured to the end of the lead screw 50 for securing the components thereto.

Figure 7:
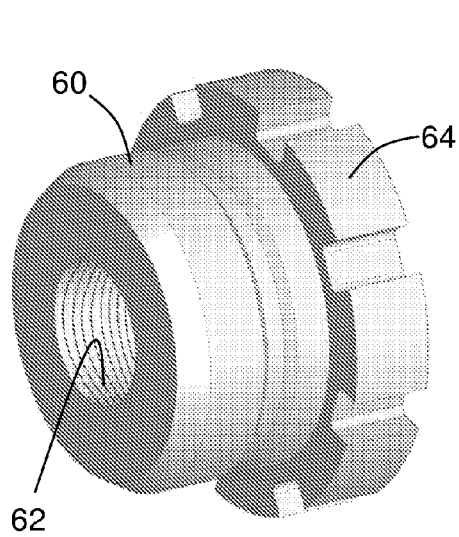
FIG. 7 is an enlarged perspective view of a nut of the linear actuator illustrated in FIG. 5.

The illustrated linear actuator 10 also includes a nut 60 that is supported for axial movement along the outer surface of the lead screw 50. As shown in FIG. 7, the nut 60 is an annular member that includes an internal thread 62. The internal thread 62 is configured to threadably engage the external thread 52 of the lead screw 50. Thus, the nut 60 axially moves along the lead screw 50 as the lead screw 50 is rotated relative to the nut 60. The direction of such axial movement of the nut 60 is dependent upon the direction of rotation of the lead screw 50. The illustrated nut 60 also includes a flange portion 64. The flange portion 64 can be crimped or otherwise segmented to prevent rotation thereof as the lead screw 50 is rotated, as will be explained below.

Referring again to FIGS. 4 and 5, the illustrated linear actuator 10 also includes an extension tube 70. The illustrated extension tube 70 is a generally cylindrical member that defines openings at both ends. A first end of the extension tube 70 is secured to the nut 60. To accomplish this, a portion of the nut 60 can be received within the first end of the extension tube 70. The nut 60 can be secured to the extension tube 70 by crimping the extension tube 70 around the nut 60. Such a connection can resolve both axial and radial loads between the extension tube 70 and the nut 60. Alternatively, the nut 60 can be secured to the extension tube 70 in any suitable manner, such as with a threaded connection for example. Further, the extension tube 70 can be made from any desired material, such as stainless steel or the like, and can be formed using any suitable method, such as an extrusion process.

The illustrated extension tube 70 includes an adapter 72 for mounting the linear actuator 10 to a separate component (not shown). The adapter 72 can be rigidly secured to the second end of the extension tube 70 by inserting a portion of the adaptor 72 therein (see FIG. 5). The adapter 72 can be secured to the extension tube 70 by crimping the extension tube 70 around the adapter 72. Such a connection can resolve both axial and radial loads between the extension tube 70 and the adapter 72. Alternatively, the adapter 72 can be secured to the extension tube 70 in any suitable manner, such as with a threaded connection for example.

As shown, an opposite end of the adapter 72 extends from the extension tube 70 and defines a mounting portion that is configured to secure the linear actuator 10 to a separate component (not shown). For example, the illustrated adapter 72 defines a bifurcated end having a thru-hole extending therethrough. The adapter 72 may, however, be configured in any manner for any desired purpose.

Referring to FIGS. 2 through 4, the illustrated linear actuator 10 includes a cover tube 80. The illustrated cover tube 80 is a generally cylindrical member having openings at both ends. As shown, a first end of the cover tube 80 is connected to the thrust tube 40. The first end of the cover tube 80 may define an external threaded portion 82 that engages the internally threaded surface 42 of the thrust tube 40. The external threaded portion 82 can be restrained within the thrust tube 40 with an adhesive if so desired. Alternatively, the cover tube 80 can be secured to the thrust tube 40 in any manner.

A second end of the cover tube 80 extends outwardly from the housing 11 through an aperture that is defined by the first and second covers 12 and 14. The cover tube 80 is supported by the housing 11 near the second end thereof, although such is not required. The cover tube 80 can be made from any desired material, such as stainless steel or the like, and can be formed using any suitable method, such as an extrusion process.

Figure 8:
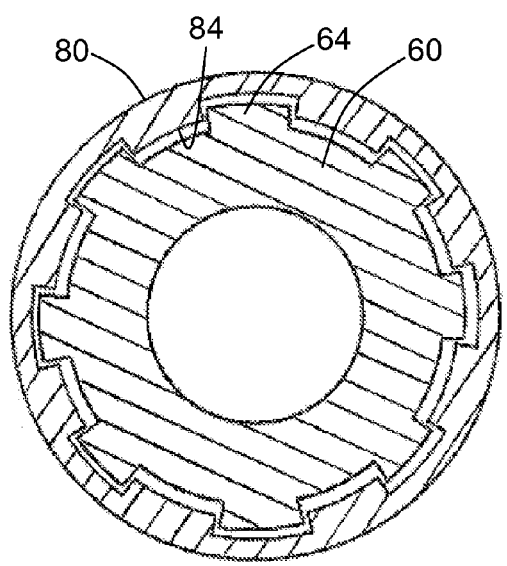
FIG. 8 is a cross-sectional end view of the nut engaged with a cover tube of the linear actuator illustrated in FIG. 4.

The cover tube 80 may also include an internal spline portion 84. The internal spline portion 84 can include any number of axially extending protrusions or rails that extend along any length of the cover tube 80. The flange portion 64 of the nut 60 cooperates with the internal spline portion 84 of the cover tube 80 (as shown in FIG. 8) so as to prevent rotation of the nut 60 relative to the cover tube 80. This configuration internally resolves torque that would otherwise be transferred from the rotating lead screw 60 to the housing 11. The internal spline portion 84 can be integrally formed with the cover tube 80, such as with an extrusion process, or can be separate components that are attached thereto if so desired. It should be appreciated, however, that the cover tube 80 can be otherwise configured in any manner to prevent rotation of the nut 60 relative to the cover tube 80.

As shown, the extension tube 70 is supported by the cover tube 80 for reciprocal movement relative thereto. For example, rotation of the output shaft 24 of the motor 20 causes corresponding rotation of the lead screw 50. As a result, rotation of the lead screw 50 causes linear movement of the nut 60 axially along the lead screw 50. The extension tube 70 is mounted to the nut 60 and therefore reciprocates in a linear fashion relative to the cover tube 80, as indicated by the arrow X.

The illustrated cover tube 80 also includes an annular seal 86. The illustrated seal 86 is secured to the second end of the cover tube 80. To accomplish this, a portion of the seal 86 may be press-fit into the cover tube 80 and secured therein by an annular groove or an adhesive. As best shown in FIG. 3, the seal 86 is disposed between the cover tube 80 and the extension tube 70. Thus, as the extension tube 70 reciprocates in a linear fashion relative to the cover tube 80, the seal 86 wipes or otherwise cleans the outer surface of the extension tube 70 to prevent debris and other contaminants from entering the cover tube 80. The seal 86 may also be configured to provide supplemental support to the end of the extension tube 70. It should be appreciated that the seal 86 can be configured in any manner to prevent contamination of the linear actuator 10 and provide support to the extension tube 70. Further, the seal 86 can be formed from any suitable material for accomplishing the functions described herein including, for example, rubber, plastic, or the like.

Referring again to FIG. 2, the linear actuator 10 also includes a strain relief member 90, although such is not required. The strain relief member 90 can be embodied as a rubber grommet that is molded directly to a wire harness cable (not shown). The strain relief member 90 can be configured to seal associated opening in the housing 11 and to provide a strain relief so that the wire harness cable (not shown) cannot be pulled out of the linear actuator 10.

The illustrated linear actuator 10 also includes a printed circuit board (PCB) 92, although such is not required. The PCB 92 is, in large measure, conventional in the art and may include an insulating substrate with various conductive traces. It should be appreciated that the PCB 92 can be any structure configured to support and electrically connect various electrical components (not shown) of the linear actuator 10.

The illustrated linear actuator 10 also includes a non-contact feedback sensor 94 for providing operating data from the linear actuator 10, although such is not required. The non-contact feedback sensor 94 (such as a Bourns SD-5999 sensor) can be provided and driven off a gear reduction, such as the first gear reduction. A single gear reduction is used that will rotate the feedback sensor 94 approximately ten turns for the longest stroke actuator (500 mm). The feedback sensor 94 is programmable to provide the requested output (typically 0.5 to 4.5 VDC with a 5.0 VDC input) for the stroke required. This feedback sensor 94 can provide either analog or digital output. In addition to increased durability due to the non-contact design, the programmability feature standardizes on a single component for analog output and a single component for digital output.

While the output of this device is programmable, a typical application would provide an output value of 0.5 VDC when the linear actuator 10 is in a retracted position and 4.5 VDC when the linear actuator 10 is in an extended position (based upon a 5.0 VDC input). In positions therebetween, the output is proportional to the stroke. For example, at 25% of stroke, the output would be 1.5 VDC; at 50% of stroke, the output would be 2.5 VDC; and at 75% of stroke, the output would be 3.5 VDC. This output can provide diagnostics through a controller (not shown). If the generated output is less than 0.5 VDC, the feedback circuit is shorted to ground; if the generated output is greater than 4.5 VDC, the feedback circuit is shorted to battery. In either case, it indicates a problem with the feedback and the controller will shut down the linear actuator 10.

The linear actuator 10 may also include electronic limit switch control that provides end-of-stroke shut off and/or a mid-stroke thrust limiting control. The electronic limit switch design senses current of the motor 20 to control travel of the extension tube 70. When the preset current threshold is reached, the controller (not shown) cuts power to the motor 20 and stops the linear actuator 10 through relays (not shown). This power shut off occurs anytime the current threshold is exceeded, which occurs at ends-of-stroke positions or due to a mid-stroke overload. The current threshold is automatically set by the controller by sampling current during the first cycle of the linear actuator 10. The threshold is independent in both operating directions of the linear actuator 10.

Further, it should be fully appreciated that the linear actuator 10 is designed and constructed of materials that are resistant to corrosion.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A linear actuator comprising:
a housing having a support tab;
a noise and vibration dampener supported on the support tab;
a motor supported on the noise and vibration dampener, the motor including an output shaft that is rotatable about a first axis;
a worm gear that cooperates with the output shaft of the motor for rotation about a second axis that is generally perpendicular to the first axis;
an input gear that is connected for rotation with the worm gear for rotation about the second axis;
a lead screw that cooperates with the input gear for rotation about a third axis that is generally parallel to the first axis, the lead screw having an external thread;
a cover tube supported on the housing and including an internal spline;
a thrust tube that is supported on the housing and includes an internally threaded surface that engages an external threaded portion provided on the cover tube; and
a nut having an internal thread that cooperates with the external thread of the lead screw and an external flange portion that cooperates with the internal spline of the cover tube such that rotation of the output shaft of the motor causes linear movement of the nut relative to the cover tube.

2. The linear actuator defined in claim 1 wherein the thrust tube includes a bifurcated end having a thru-hole extending therethrough.

3. The linear actuator defined in claim 1 wherein a portion of the gear extends into an opening formed in the thrust tube.

4. The linear actuator defined in claim 1 further including an extension tube that is secured to the nut.

5. The linear actuator defined in claim 1 wherein the extension tube includes an adapter having a bifurcated end having a thru-hole extending therethrough.

6. The linear actuator defined in claim 1 wherein an end of the output shaft is supported on the housing.

7. The linear actuator defined in claim 1 wherein an end of the output shaft is supported on a bushing that is supported on the housing.

* * * * *